United States Patent
Cheng (10) Patent No.: US 9,195,286 B2
(45) Date of Patent: Nov. 24, 2015

(54) METHOD FOR PERFORMING POWER CONSUMPTION CONTROL, AND ASSOCIATED APPARATUS

(75) Inventor: Chao-Kuo Cheng, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 752 days.

(21) Appl. No.: 13/430,638

(22) Filed: Mar. 26, 2012

(65) Prior Publication Data
US 2013/0249521 A1  Sep. 26, 2013

(51) Int. Cl.
G01R 27/26 (2006.01)
G06F 1/26 (2006.01)
G06F 1/28 (2006.01)
G06F 1/32 (2006.01)

(52) U.S. Cl.
CPC .. G06F 1/26 (2013.01); G06F 1/28 (2013.01); G06F 1/3206 (2013.01); G06F 1/3287 (2013.01); *Y02B 60/1282* (2013.01)

(58) Field of Classification Search
CPC .... G01R 22/065; G01R 22/063; G01R 11/04; H01R 25/00
USPC .................... 702/63; 320/134–136
See application file for complete search history.

(56) References Cited

U.S. PATENT DOCUMENTS

| | | | | |
|---|---|---|---|---|
| 4,421,993 A * | 12/1983 | Bloomer | ...................... | 307/126 |
| 5,239,628 A * | 8/1993 | Hasebe et al. | ................. | 713/400 |
| 5,341,503 A * | 8/1994 | Gladstein et al. | ............. | 713/340 |
| 5,459,671 A * | 10/1995 | Duley | .............................. | 702/63 |
| 5,565,759 A * | 10/1996 | Dunstan | ....................... | 320/135 |
| 5,600,230 A * | 2/1997 | Dunstan | ................... | 340/636.13 |
| 5,633,573 A * | 5/1997 | van Phuoc et al. | ............ | 320/128 |
| 5,640,081 A * | 6/1997 | Austin et al. | ................... | 320/127 |
| 5,714,870 A | 2/1998 | Dunstan | | |
| 5,941,997 A | 8/1999 | Greaves | | |
| 6,018,646 A | 1/2000 | Myllymaki | | |
| 6,208,117 B1 * | 3/2001 | Hibi | ............................. | 320/134 |
| 6,229,286 B1 * | 5/2001 | Tokuyama | .................... | 320/132 |
| 6,246,215 B1 * | 6/2001 | Popescu-Stanesti | ......... | 320/139 |
| 7,532,448 B2 * | 5/2009 | So | ................................ | 361/93.9 |
| 7,574,614 B2 | 8/2009 | Koo | | |
| 7,928,703 B2 | 4/2011 | Tan | | |

(Continued)

FOREIGN PATENT DOCUMENTS

CN 102323474 A 1/2012

*Primary Examiner* — Patrick Assouad
*Assistant Examiner* — Lamarr Brown
(74) *Attorney, Agent, or Firm* — Winston Hsu; Scott Margo (57) ABSTRACT

A method for performing power consumption control is provided, where the method is applied to an electronic device. The method includes: sensing a current on a current path between a battery and at least one portion of the electronic device by performing sampling operations to generate a plurality of samples; performing calculation on the samples to monitor the current; and based upon the calculation, when it is detected that the current reaches a predetermined threshold, triggering a post processing operation to be performed within the electronic device. In particular, performing the sampling operations to generate the plurality of samples further includes: utilizing an analog-to-digital converter (ADC) to perform the sampling operations on a voltage difference corresponding to the current to generate the plurality of samples. For example, the voltage difference can be obtained by probing two terminals of a resistor or a Hall component. An associated apparatus is also provided.

20 Claims, 9 Drawing Sheets

(56) References Cited

U.S. PATENT DOCUMENTS

| | | | |
|---|---|---|---|
| 8,228,038 B2 * | 7/2012 | Mullen et al. | 320/135 |
| 8,695,008 B2 * | 4/2014 | Regini et al. | 718/104 |
| 8,769,315 B1 * | 7/2014 | Ortiz et al. | 713/300 |
| 2002/0145477 A1 | 10/2002 | Marten | |
| 2003/0051177 A1 | 3/2003 | Koo | |
| 2006/0076934 A1 * | 4/2006 | Ogata et al. | 320/136 |
| 2006/0158363 A1 | 7/2006 | Gangsto | |
| 2006/0222108 A1 * | 10/2006 | Cousineau | 375/324 |
| 2007/0085822 A1 * | 4/2007 | Lagnado | 345/156 |
| 2008/0049653 A1 * | 2/2008 | Demirhan et al. | 370/311 |
| 2009/0140744 A1 | 6/2009 | Iwane | |
| 2010/0210322 A1 * | 8/2010 | Kim et al. | 455/574 |
| 2011/0119515 A1 * | 5/2011 | Sadwick et al. | 713/340 |
| 2011/0249836 A1 * | 10/2011 | Solum et al. | 381/314 |
| 2011/0299681 A1 * | 12/2011 | Kubota et al. | 380/247 |
| 2012/0133331 A1 * | 5/2012 | Ling et al. | 320/132 |
| 2013/0041607 A1 * | 2/2013 | Zimmerman et al. | 702/63 |
| 2014/0025322 A1 * | 1/2014 | Yang et al. | 702/63 |

* cited by examiner

METHOD FOR PERFORMING POWER CONSUMPTION CONTROL, AND ASSOCIATED APPARATUS

BACKGROUND

The present invention relates to power management mechanism of an electronic device, and more particularly, to a method for performing power consumption control, and to an associated apparatus.

According to the related art, a portable electronic device (e.g., a multifunctional mobile phone, a personal digital assistant (PDA), a tablet, etc) can be very helpful to an end user. Typically, various kinds of applications can be run on the portable electronic device for different purposes, respectively. In a situation where any of the portable electronic device and applications is not properly designed, some problems may occur. For example, a program module may enable a specific wireless transmission functionality of the portable electronic device, and when the program module becomes inactive without disabling the specific wireless transmission functionality, unnecessary power consumption due to the specific wireless transmission functionality may exist, which may cause the remaining power of the battery of the portable electronic device to decrease rapidly. In another example, an application may turn on a specific sensing unit of the portable electronic device, and when the application is terminated without turning off the specific sensing unit, unnecessary power consumption due to the specific sensing unit may exist since the sending unit is not turned off. In conclusion, the related art does not serve the end user well. Thus, a novel method is required for enhancing power consumption control of an electronic device.

SUMMARY

It is therefore an objective of the claimed invention to provide a method for performing power consumption control, and to provide an associated apparatus, in order to solve the above-mentioned problems.

An exemplary embodiment of a method for performing power consumption control is provided, where the method is applied to an electronic device. The method comprises the steps of: sensing at least one current on at least one current path between a battery and at least one portion of the electronic device by performing sampling operations to generate a plurality of samples; performing calculation on the samples to monitor the current; and based upon the calculation, when it is detected that the current reaches a predetermined threshold, triggering a post processing operation to be performed within the electronic device.

An exemplary embodiment of an apparatus for performing power consumption control is provided, where the apparatus comprises at least one portion of an electronic device. The apparatus comprises a current sensing circuit and a control module. The current sensing circuit is capable of sensing at least one current on at least one current path between a battery and at least one portion of the electronic device by performing sampling operations to generate a plurality of samples. In addition, the control module is capable of performing calculation on the samples to monitor the current, wherein based upon the calculation, when it is detected that the current reaches a predetermined threshold, the control module is capable of triggering a post processing operation to be performed within the electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
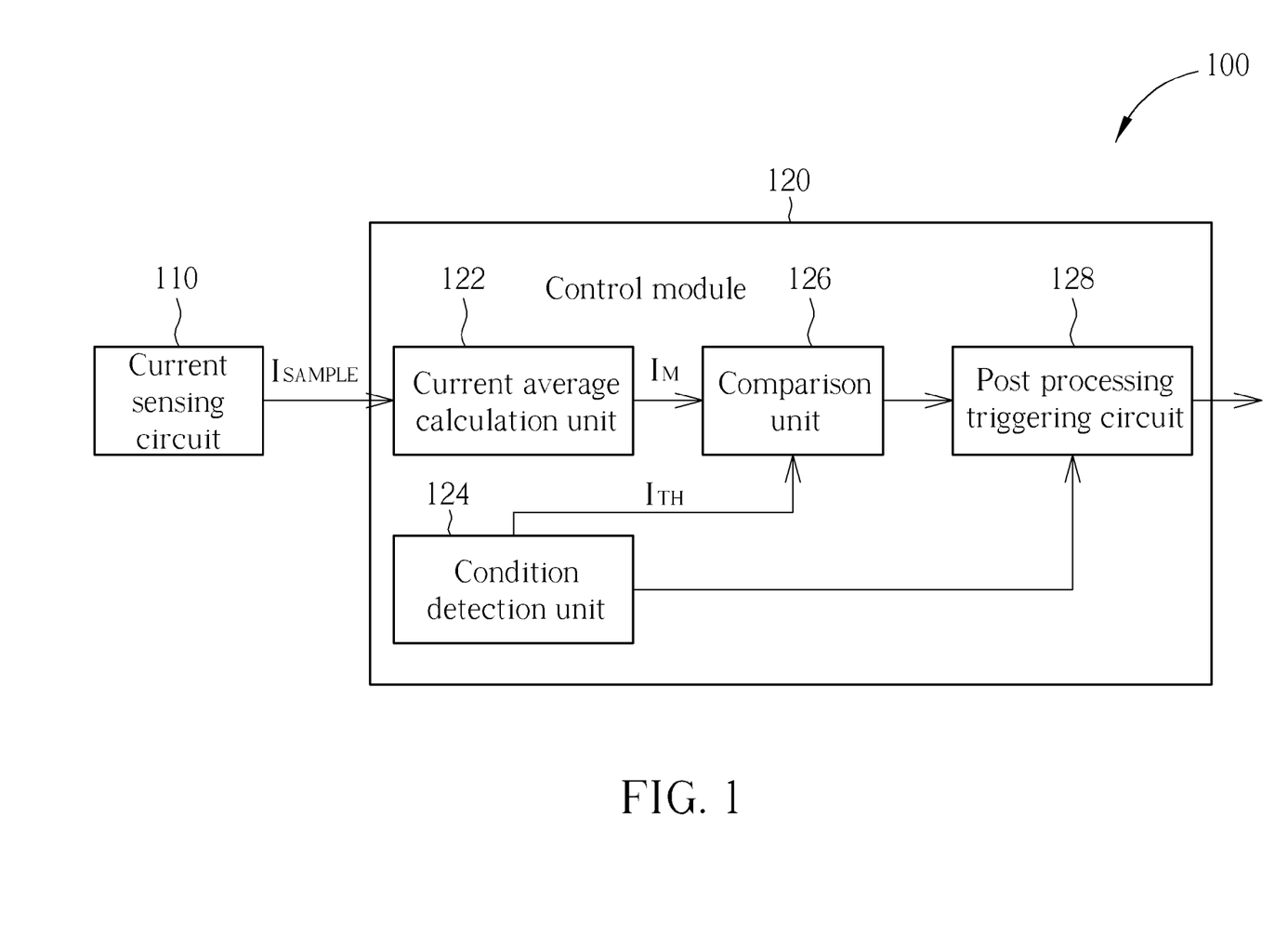
FIG. 1 is a diagram of an apparatus for performing power consumption control according to a first embodiment of the present invention.

Please refer to FIG. 1, which illustrates a diagram of an apparatus 100 for performing power consumption control according to a first embodiment of the present invention. According to different embodiments, such as the first embodiment and some variations thereof, the apparatus 100 may comprise at least one portion (e.g. a portion or all) of an electronic device such as a portable electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. In another example, the apparatus 100 can be an audio/video system comprising the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a tablet personal computer (which can also be referred to as the tablet, for simplicity), a laptop computer, or desktop computer.

As shown in FIG. 1, the apparatus 100 can comprise a current sensing circuit 110 and a control module 120, where the control module 120 can comprise a current average calculation unit 122, a condition detection unit 124, a comparison unit 126, and a post processing triggering circuit 128. The current sensing circuit 110 is capable of sensing at least one current I (not shown in FIG. 1) on at least one current path between a battery and at least one portion of the aforementioned electronic device by performing sampling operations to generate a plurality of samples $\{I_{SAMPLE}\}$. For example, in a situation where the aforementioned at least one current comprises a plurality of currents $\{I\}$ such as currents $I_1, I_2, I_3$, etc. (not shown in FIG. 1), the current sensing circuit 110 is capable of sensing the currents $\{I\}$ such as the currents $I_1, I_2, I_3$, etc. on multiple current paths between the battery and multiple portions of the electronic device by performing the sampling operations to generate the samples $\{I_{SAMPLE}\}$, respectively. In another example, in a situation where the aforementioned at least one current comprises one current I (not shown in FIG. 1), such as the total current output (or drawn) from the battery or the total current input into the battery, the current sensing circuit 110 is capable of sensing the current I on one current path between the battery and at least one portion of the electronic device by performing the sampling operations to generate the samples $\{I_{SAMPLE}\}$. In addition, the control module 120 is capable of performing calculation on the samples $\{I_{SAMPLE}\}$ to monitor the current I. Based upon the calculation, when it is detected that the current I (more particularly, the representative $I_M$ thereof, such as a calculation result of the calculation) reaches a predetermined threshold $I_{TH}$, the control module 120 is capable of triggering a post processing operation to be performed within the electronic device. For example, the post processing operation can be utilized for reducing power consumption.

According to this embodiment, the current average calculation unit 122 is capable of performing the calculation such as moving average calculation on the samples $\{I_{SAMPLE}\}$ to generate the representative $I_M$ of the current I, and the comparison unit 126 is capable of comparing the representative $I_M$ of the current I with the predetermined threshold $I_{TH}$, in order to detect whether the current I (more particularly, the representative $I_M$ thereof, such as a moving average calculation result of the moving average calculation) reaches the predetermined threshold $I_{TH}$, where the post processing triggering circuit 128 is capable of triggering the post processing operation when it is detected that the current I (more particularly, the representative $I_M$ thereof, such as the moving average calculation result mentioned above) reaches the predetermined threshold $I_{TH}$. More particularly, the predetermined threshold $I_{TH}$ can be selected from a plurality of predetermined thresholds defined in at least one predetermined table, where the condition detection unit 124 is capable of performing the selection. The predetermined table can be within the electronic device or not, depending on different design requirements. For example, the aforementioned at least one predetermined table can be stored in the condition detection unit 124. In another example, the aforementioned at least one predetermined table can be stored in a memory (e.g. a volatile memory such as a random access memory (RAM), or a non-volatile memory such as a Flash memory). In another example, the aforementioned at least one predetermined table can be stored in a hard disk drive (HDD). This is for illustrative purposes only, and is not meant to be a limitation of the present invention. According to a variation of this embodiment, the predetermined threshold $I_{TH}$ can be a fixed value, rather than being selected from the plurality of predetermined thresholds, where implementing the condition detection unit 124 in this variation may be unnecessary. According to some variations of this embodiment, the comparison result output from the comparison unit 126 can be utilized for selectively triggering the post processing operation. For example, a first state of the comparison result output from the comparison unit 126 may trigger the post processing operation, while a second state of the comparison result output from the comparison unit 126 may not trigger the post processing operation. Thus, implementing the post processing triggering circuit 128 in these variations may be unnecessary.

As disclosed above, the moving average calculation can be taken as an example of the aforementioned calculation. This is for illustrative purposes only, and is not meant to be a limitation of the present invention. According to a variation of this embodiment, the aforementioned calculation may represent calculating an average of some of the samples $\{I_{SAMPLE}\}$ within a predetermined unit interval (e.g. a time period of a predetermined length), where the predetermined unit interval may be adjusted based upon different design requirements. According to another variation of this embodiment, the average may be replaced by a sum. For example, the aforementioned calculation may represent calculating the sum of some of the samples $\{I_{SAMPLE}\}$ within a predetermined unit interval such as that mentioned above. According to another variation of this embodiment, the average may be replaced by a maximum. For example, the aforementioned calculation may represent calculating the maximum of some of the samples $\{I_{SAMPLE}\}$ within a predetermined unit interval such as that mentioned above.

In the embodiment shown in FIG. 1, the condition detection unit 124 is capable of checking the electronic device to detect whether a specific condition of a plurality of predetermined conditions is satisfied. When it is detected that the specific condition is satisfied, the condition detection unit 124 utilizes a specific predetermined threshold corresponding to the specific condition as the predetermined threshold $I_{TH}$. More particularly, the plurality of predetermined conditions can be defined in the aforementioned at least one predetermined table, where the condition detection unit 124 can retrieve condition information corresponding to at least one portion of the predetermined conditions from the aforementioned at least one predetermined table, for use of checking the electronic device, in order to detect whether the specific condition is satisfied. In practice, the condition information may represent some of the predetermined conditions that the electronic device would probably encounter, and the condition detection unit 124 can detect whether the current condition of the electronic device matches the specific condition of the predetermined conditions. The predetermined conditions can be any conditions that the electronic device would encounter. For example, the predetermined conditions may include surfing the internet, playing games, playing music, running application, sleep mode, etc., and corresponding thresholds can be determined for these conditions so that abnormal or excess power consumption can be detected. In some further embodiments, some applications that the user downloaded from websites may be defective. A first application within these defective applications may enable the Wireless Fidelity (Wi-Fi) functionality during running and stop running without disabling the Wi-Fi functionality, causing unnecessary power consumption and unnecessary working load. A second application within these defective applications may enable the G-sensor during running and stop running without disabling the G-sensor, causing unnecessary power consumption. The apparatus 100 may record historical information regarding these situations and respectively compare the historical information of the applications under consideration (e.g. the first application and the second application) with the condition information such as a predetermined pattern (e.g. a plurality of predetermined bits, each of which may represent the enabling/disabling status of a functionality of the electronic device or the enabling/disabling status of a component of the electronic device). The historical information of each of the applications under consideration (e.g. the first application and the second application) typically comprises some bits to be compared with the predetermined pattern, such as a plurality of bits representing the enabling/disabling statuses of some functionalities and/or some components of the electronic device. When these bits to be compared match the predetermined pattern, the apparatus 100 can determine that a predetermined condition is detected.

As disclosed above, the condition information may represent some of the predetermined conditions that the electronic device would probably encounter. This is for illustrative purposes only, and is not meant to be a limitation of the present invention. According to a variation of this embodiment, the condition information may represent some possible scenarios that the electronic device would probably encounter, and the condition detection unit 124 can detect whether the current condition of the electronic device matches a specific scenario of the possible scenarios.

According to some variations of this embodiment, the post processing operation can be selected from a plurality of predetermined post processing operations defined in the aforementioned at least one predetermined table. When it is detected that the specific condition is satisfied, the control module 120 is capable of utilizing a specific predetermined post processing operation corresponding to the specific condition as the post processing operation mentioned above.

Figure 2:
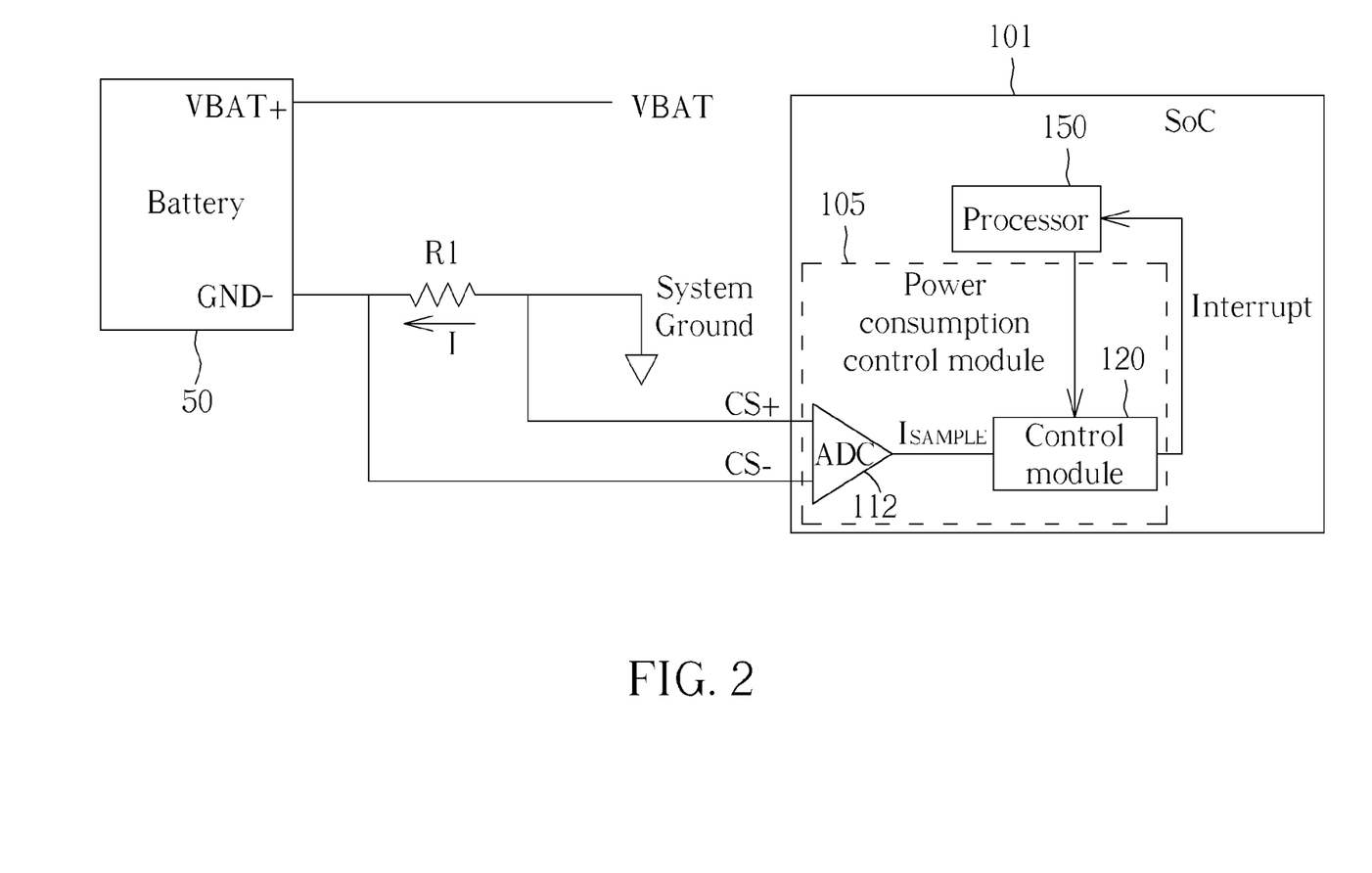
FIG. 2 illustrates some implementation details involved with the apparatus shown in FIG. 1 according to an embodiment of the present invention.

FIG. 2 illustrates some implementation details involved with the apparatus 100 shown in FIG. 1 according to an embodiment of the present invention. A battery 50 is taken as an example of the battery mentioned in the first embodiment, where the positive terminal VBAT+ of the battery 50 can be electrically connected to the battery input terminal VBAT of the electronic device, and the ground terminal GND− of the battery 50 can be coupled to the system ground of the electronic device through a resistor R1.

As shown in FIG. 2, the electronic device can comprise a chip 101 (labeled "SoC", which means system-on-chip). The chip 101 may comprise at least one processor 150 and a power consumption control module 105. Here, the chip 101 is taken as an example of implementing the apparatus 100. This is for illustrative purposes only, and is not meant to be a limitation of the present invention. According to some variations of this embodiment, it is unnecessary to implement the apparatus 100 with the chip 101, where the apparatus 100 can be implemented to be a non-SoC apparatus, such as a system comprising some components positioned on a printed circuit board (PCB). According to the embodiment shown in FIG. 2, the current sensing circuit 110 in FIG. 1 may comprise an analog-to-digital converter (ADC) 112 having a first input terminal CS+ and a second input terminal CS−, and may further comprise at least one resistor having a first terminal and a second terminal, such as the resistor R1 shown in FIG. 2, where the ADC 112 and the control module 120 can be implemented within the power consumption control module 105 of the chip 101, and the first input terminal CS+ and the second input terminal CS− can be utilized for receiving a first voltage level and a second voltage level, respectively. The ADC 112 is capable of performing the sampling operations on a voltage difference corresponding to the current I to generate the plurality of samples $\{I_{SAMPLE}\}$, where the voltage difference is a difference between the first voltage level at the first terminal and the second voltage level at the second terminal. For example, the processor 150 can control the ADC 112 to perform the sampling operations. This is for illustrative purposes only, and is not meant to be a limitation of the present invention. According to a variation of this embodiment, the current sensing circuit 110 in FIG. 1 may comprise at least one Hall component having a first terminal and a second terminal, where the resistor R1 is replaced with the aforementioned at least one Hall component. Thus, the voltage difference is a difference between the first voltage level at the first terminal of the Hall component and the second voltage level at the second terminal of the Hall component.

The post processing operation may comprise some operation(s) for reducing power consumption. For example, the post processing operation may comprise disabling a wireless transmission functionality of the electronic device, and when the control module 120 triggers the post processing operation by utilizing an interrupt signal (labeled "Interrupt" in FIG. 2), the electronic device is capable of disabling the wireless transmission functionality mentioned above. This is for illustrative purposes only, and is not meant to be a limitation of the present invention. According to a variation of this embodiment, the post processing operation may comprise turning off at least one component of the electronic device, and when the control module 120 triggers the post processing operation by utilizing an interrupt signal such as that mentioned above, the electronic device is capable of turning off the aforementioned at least one component. In other embodiments, the post processing operation may comprise checking which software/firmware/hardware cause(s) the current to reach the predetermined threshold, disabling a software module, disabling an application, warning user of unusual power consumption, etc.

Figure 3:
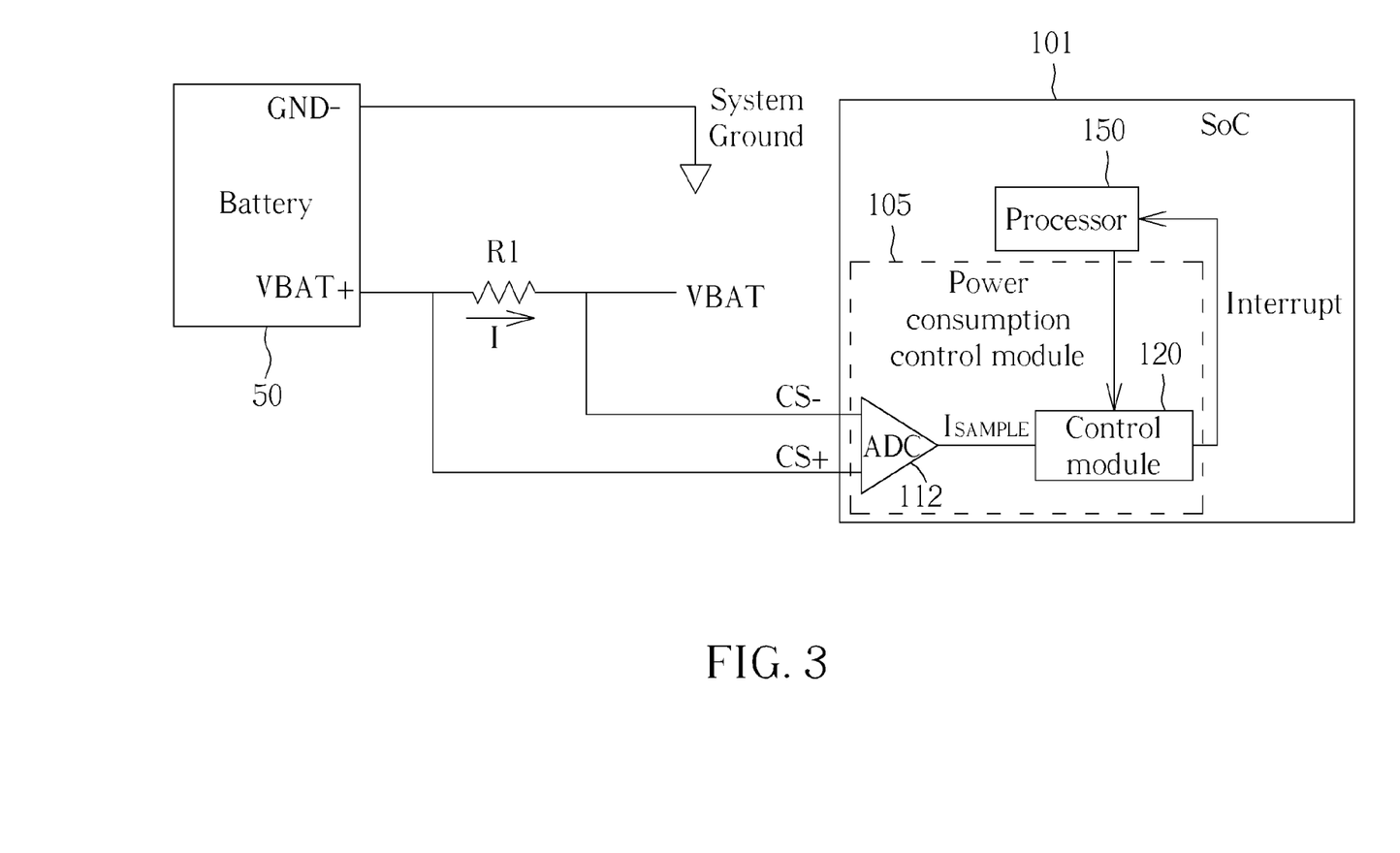
FIG. 3 illustrates some implementation details involved with the apparatus shown in FIG. 1 according to another embodiment of the present invention.

FIG. 3 illustrates some implementation details involved with the apparatus 100 shown in FIG. 1 according to another embodiment of the present invention. The battery 50 is taken as an example of the battery mentioned in the first embodiment, where the positive terminal VBAT+ of the battery 50 can be coupled to the battery input terminal VBAT of the electronic device through the resistor R1, and the ground terminal GND− of the battery 50 can be electrically connected to the system ground of the electronic device. Similar descriptions are not repeated in detail for this embodiment.

According to a variation of this embodiment, the current sensing circuit 110 may comprise at least one Hall component having a first terminal and a second terminal, where the resistor R1 is replaced with the aforementioned at least one Hall component. Thus, the voltage difference is a difference between the first voltage level at the first terminal of the Hall component and the second voltage level at the second terminal of the Hall component. Similar descriptions are not repeated in detail for this variation.

Figure 4:
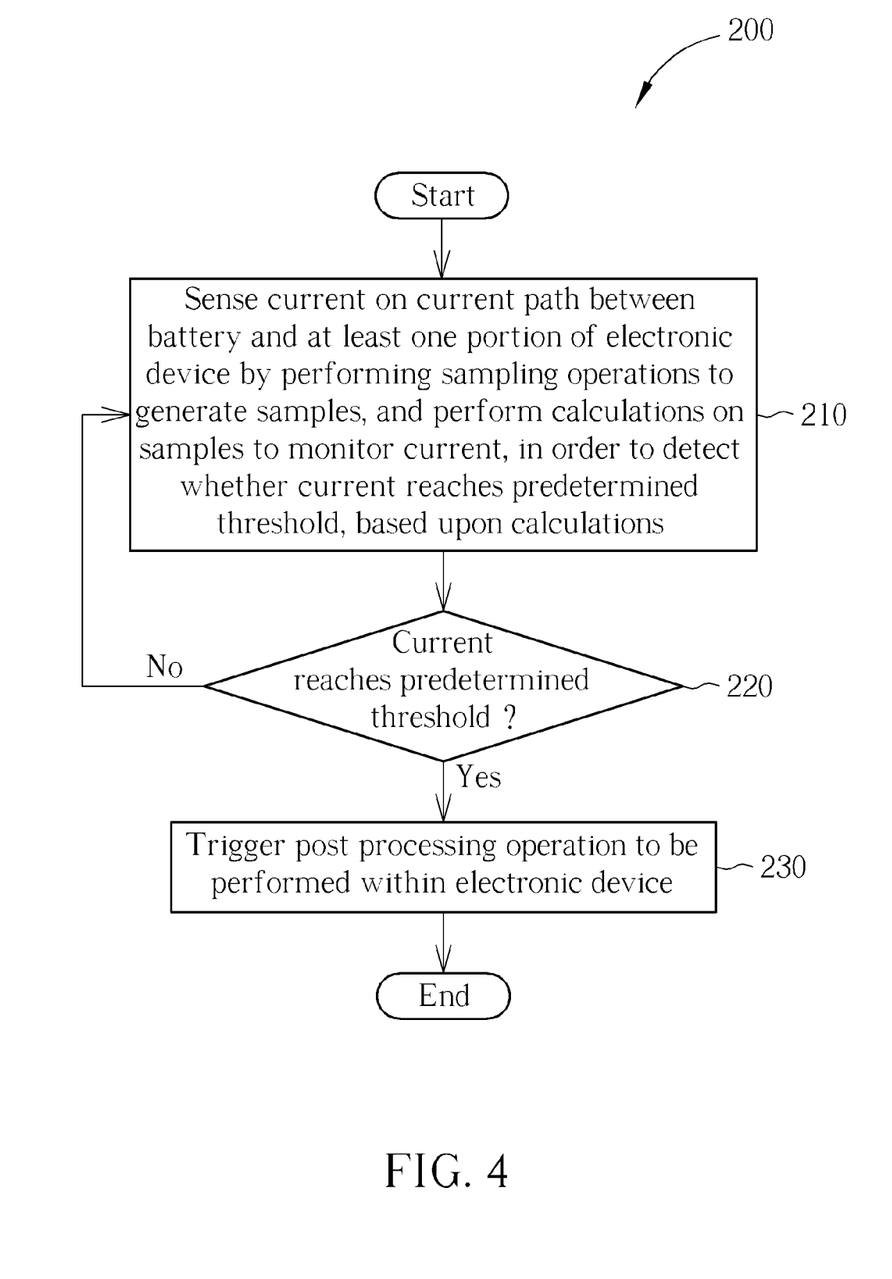
FIG. 4 illustrates a flowchart of a method for performing power consumption control according to an embodiment of the present invention.

FIG. 4 illustrates a flowchart of a method 200 for performing power consumption control according to an embodiment of the present invention. The method shown in FIG. 4 can be applied to the apparatus 100 shown in FIG. 1. The method is described as follows.

In Step 210, the current sensing circuit 110 is capable of sensing the current I on the current path between the battery and the aforementioned at least one portion (e.g. one or more of a plurality of portions) of the electronic device by performing the sampling operations to generate the samples $\{I_{SAMPLE}\}$, and the control module 120 is capable of performing the calculation on the samples $\{I_{SAMPLE}\}$ to monitor the current I, in order to detect whether the current I reaches the predetermined threshold $I_{TH}$, based upon the calculation.

In Step 220, the control module 120 (more particularly, the comparison unit 126) is capable of detecting whether the representative $I_M$ of the current I reaches the predetermined threshold $I_{TH}$, based upon the calculation. When it is detected that the representative $I_M$ of the current I reaches the predetermined threshold $I_{TH}$, Step 230 is entered; otherwise, Step 210 is re-entered.

In Step 230, the control module 120 (more particularly, the post processing triggering circuit 128) is capable of triggering the aforementioned post processing operation to be performed within the electronic device. After the triggering operation of Step 230 is performed, the working flow shown in FIG. 4 comes to an end. This is for illustrative purposes only, and is not meant to be a limitation of the present invention. According to a variation of this embodiment, after the triggering operation of Step 230 is performed, Step 210 can be re-entered. That is, the operations of the working flow shown in FIG. 4 can be repeated.

According to different embodiments, such as some variations of the embodiment shown in FIG. 4, the previously disclosed operations (e.g. the operations disclosed in any of the embodiments respectively shown in FIGS. 1-3 and the associated variations thereof) can be applied to the method 200 shown in FIG. 4, and therefore, similar descriptions are not repeated in detail.

According to different embodiments, such as some variations of the embodiment shown in FIG. 4, the above-disclosed operations of the method 200 can be performed even in the sleep mode in which processor(s) within the aforementioned at least one processor 150 (e.g. one or more of those shown in the following embodiments) falls asleep, since performing the sampling operations, performing the calculations, and triggering the post processing operation can be completed by hardware architecture, having no need to use software in the sleep mode. In a situation where the post processing operation is triggered due to abnormal or excess current/power consumption (e.g. an interrupt is sent), the processor that has fallen asleep can be woken up to handle the aforementioned abnormal or excess current/power consumption with some software program(s) running on the processor.

Figure 5:
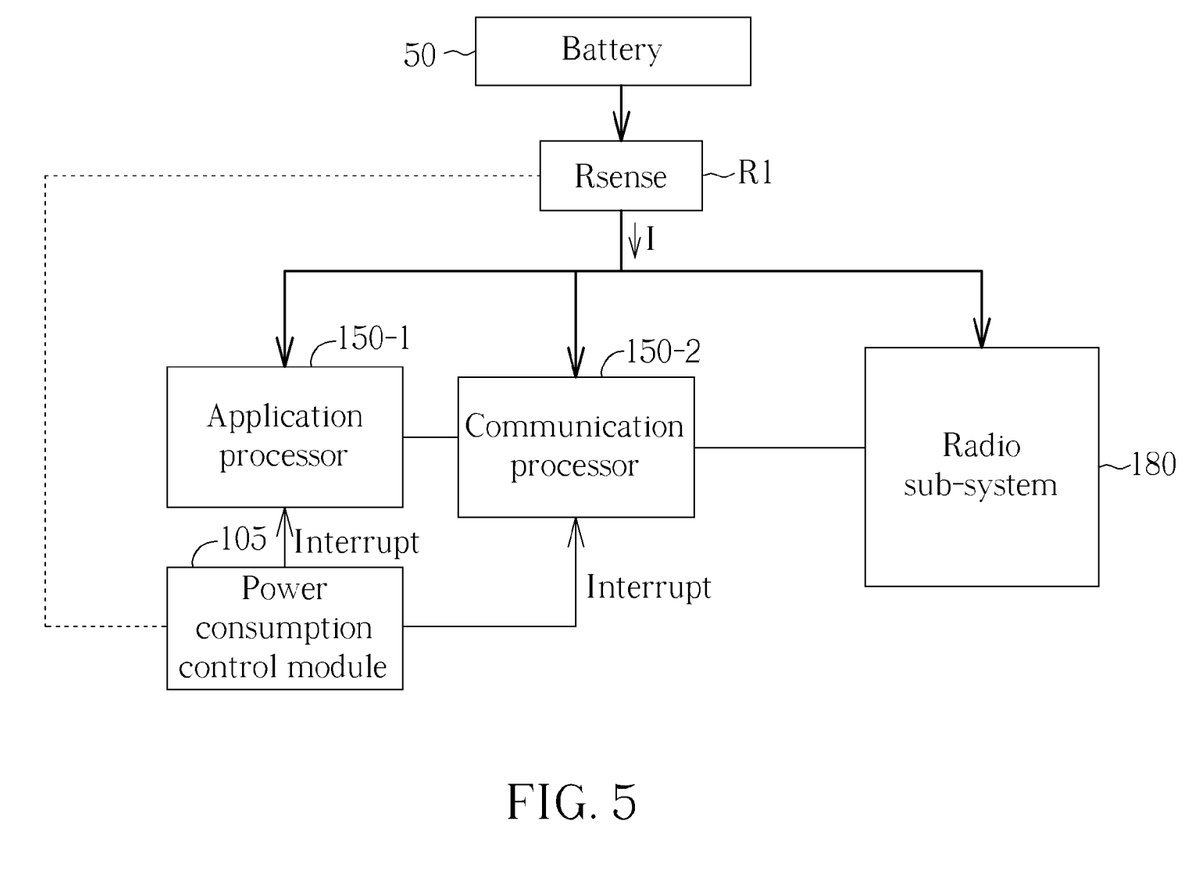
FIG. 5 illustrates a first exemplary scenario involved with the method shown in FIG. 4 according to an embodiment of the present invention.

FIG. 5 illustrates a first exemplary scenario involved with the method 200 shown in FIG. 4 according to an embodiment of the present invention, where the first exemplary scenario can be taken as an example of the possible scenarios mentioned above. The aforementioned at least one processor 150 may comprise an application processor 150-1 and a communication processor 150-2 (e.g. a modulator-demodulator (modem)). In addition, the electronic device may further comprise a radio sub-system 180. For example, the radio sub-system 180 can comprise a transceiver, a power amplifier, etc. that may operate under control of the application processor 150-1 and/or the communication processor 150-2. According to this embodiment, the communication processor 150-2 can directly control the radio sub-system 180 and the application processor 150-1 can indirectly control the radio sub-system 180 due to the electrical connection relationships between them, where the application processor 150-1 can communicate with the communication processor 150-2 to indirectly control the radio sub-system 180. In practice, the application processor 150-1 and the communication processor 150-2 can have respective Central Processing Units (CPUs) running their own Operating Systems (OSs), respectively, where the application processor 150-1 and the communication processor 150-2 can receive interrupts, respectively, and each of the application processor 150-1 and the communication processor 150-2 can operate in response to an interrupt received from the power consumption control module 105. This is for illustrative purposes only, and is not meant to be a limitation of the present invention. According to some variations of this embodiment, the application processor 150-1 and the communication processor 150-2 can be integrated into the same processor, or the functions of the application processor 150-1 and the communication processor 150-2 can be performed by a single processor.

As shown in FIG. 5, the resistor R1 (labeled "Rsense", which means the resistor for sensing the at least one current I) can be utilized for sensing the total current output from the battery 50 to the application processor 150-1, the communication processor 150-2, and the radio sub-system 180. Based upon the aforementioned voltage difference such as the difference between the first voltage level at the first terminal of the resistor R1 and the second voltage level at the second terminal of the resistor R1, the power consumption control module 105 can check whether abnormal or excess current/power consumption occurs during operation using the radio sub-system 180, such as a talking service, a data-link operation, etc.

Figure 6:
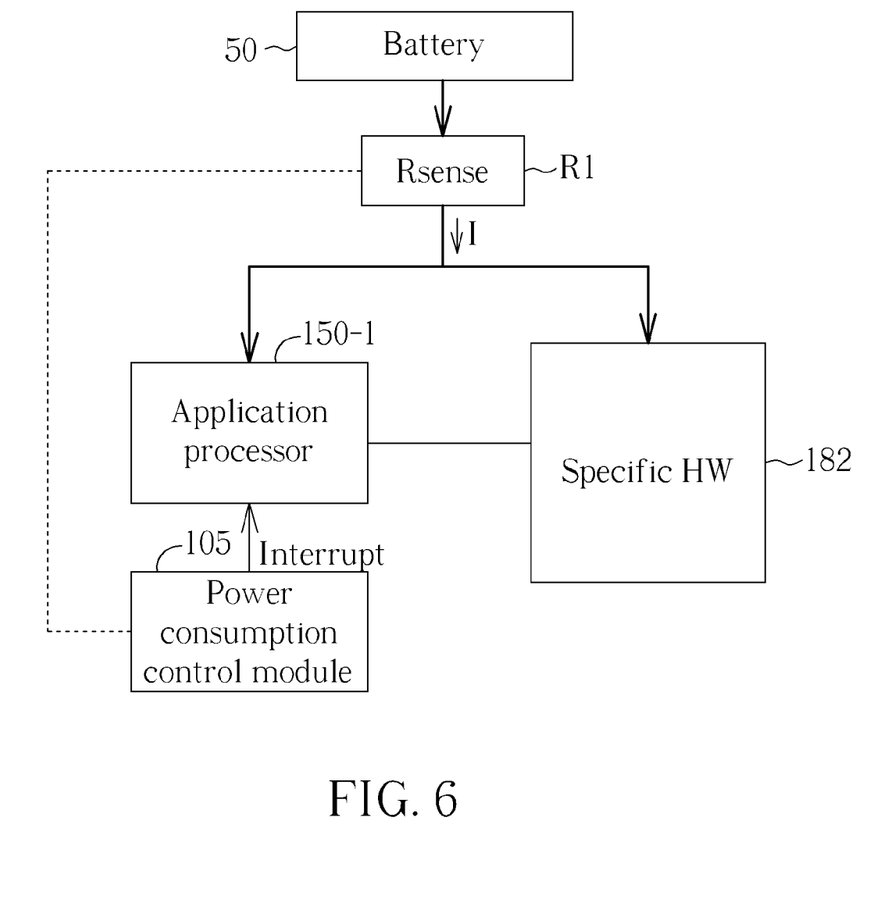
FIG. 6 illustrates a second exemplary scenario involved with the method shown in FIG. 4 according to another embodiment of the present invention.

FIG. 6 illustrates a second exemplary scenario involved with the method 200 shown in FIG. 4 according to another embodiment of the present invention, where the second exemplary scenario can be taken as an example of the possible scenarios mentioned above. The application processor 150-1 can be the same as that shown in FIG. 5. The electronic device may further comprise a specific hardware module 182 (labeled "Specific HW" in FIG. 6) that typically operates under control of the application processor 150-1. The specific hardware module 182 (e.g. the G-sensor, or the Wi-Fi circuit for providing the apparatus 100 with the Wi-Fi functionality, etc.) may temporarily or permanently malfunction or be damaged in some situations, causing abnormal or excess current/power consumption.

As shown in FIG. 6, when it is detected that the specific hardware module 182 behaves abnormally (e.g. the current I is abnormal, and/or the power consumption is abnormal), the application processor 150-1 may receive an interrupt such as that mentioned above. More particularly, based upon the aforementioned voltage difference such as the difference between the first voltage level at the first terminal of the resistor R1 and the second voltage level at the second terminal of the resistor R1, the power consumption control module 105 can detect the abnormal or excess current/power consumption of the specific hardware module 182.

Figure 7:
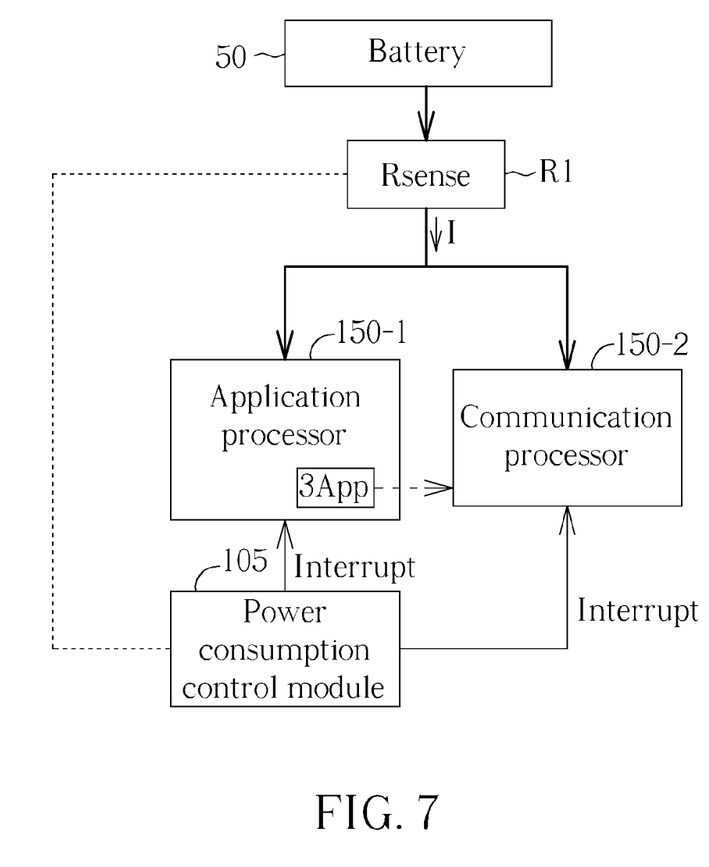
FIG. 7 illustrates a third exemplary scenario involved with the method shown in FIG. 4 according to yet another embodiment of the present invention.

FIG. 7 illustrates a third exemplary scenario involved with the method 200 shown in FIG. 4 according to yet another embodiment of the present invention, where the third exemplary scenario can be taken as an example of the possible scenarios mentioned above, and the application processor 150-1 and the communication processor 150-2 can be the same as that shown in FIG. 5, respectively.

As shown in FIG. 7, a $3^{rd}$ party application (labeled "3App") runs on the application processor 150-1, and may wake up the communication processor 150-2. Please note that, typically, a conventional application processor in the related art is not aware of that the $3^{rd}$ party application wakes up a conventional communication processor. According to this embodiment, with the aid of the power consumption control module 105, the application processor 150-1 is aware of that the $3^{rd}$ party application unnecessarily wakes up the communication processor 150-2 and causes excess power consumption, and therefore, the application processor 150-1 can alter some operation(s) of the $3^{rd}$ party application to reduce power consumption of the communication processor 150-2 (e.g. stop running the 3$^{rd}$ party application). This is for illustrative purposes only, and is not meant to be a limitation of the present invention. According to some variations of this embodiment, the 3$^{rd}$ party application mentioned above can be replaced by any application that may unnecessarily wake up the communication processor 150-2. According to some variations of this embodiment, the 3$^{rd}$ party application mentioned above can be replaced by any application that may unnecessarily wake up the application processor 150-1.

According to a variation of the embodiment shown in FIG. 7, the power consumption control module 105 can detect abnormal or excess current/power consumption of the communication processor 150-2 when the application processor 150-1 is in a sleep mode, and the architecture shown in FIG. 7 and the associated operations thereof are helpful on reducing power consumption of the communication processor 150-2. Similar descriptions are not repeated in detail for this variation.

Figure 8:
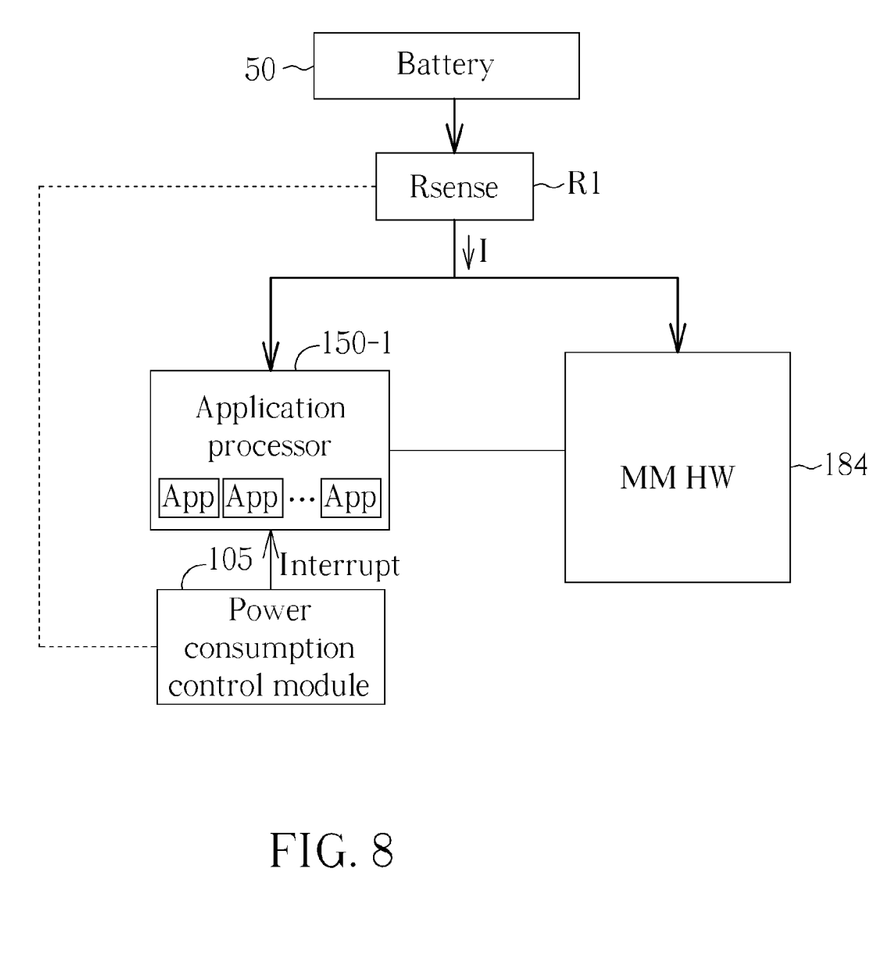
FIG. 8 illustrates a fourth exemplary scenario involved with the method shown in FIG. 4 according to still another embodiment of the present invention.

FIG. 8 illustrates a fourth exemplary scenario involved with the method 200 shown in FIG. 4 according to still another embodiment of the present invention, where the fourth exemplary scenario can be taken as an example of the possible scenarios mentioned above. The application processor 150-1 can be the same as that shown in FIG. 5. The electronic device may further comprise a multimedia hardware module 184 (labeled "MM HW" in FIG. 8) that can operate under control of the application processor 150-1. Some applications (labeled "APP", respectively) such as some multimedia-related applications running on the application processor 150-1 may enable, disable, or control the multimedia hardware module 184. The multimedia hardware module 184 can be a graphic accelerator, a video encoder/decoder, or an audio encoder/decoder. In another example, the multimedia hardware module 184 may comprise a graphic accelerator, a video encoder/decoder, and/or an audio encoder/decoder.

As shown in FIG. 8, the power consumption control module 105 can detect abnormal or excess current/power consumption of the multimedia hardware module 184 caused by the multimedia-related applications running on the application processor 150-1, and the architecture shown in FIG. 8 and the associated operations thereof are helpful on reducing power consumption of the multimedia hardware module 184. For example, during some multimedia static scenario such as music playback, video playback/recording, camera preview, etc., the power consumption control module 105 can detect abnormal or excess current/power consumption thereof, and can further trigger the post processing operation, in order to reduce power consumption.

Figure 9:
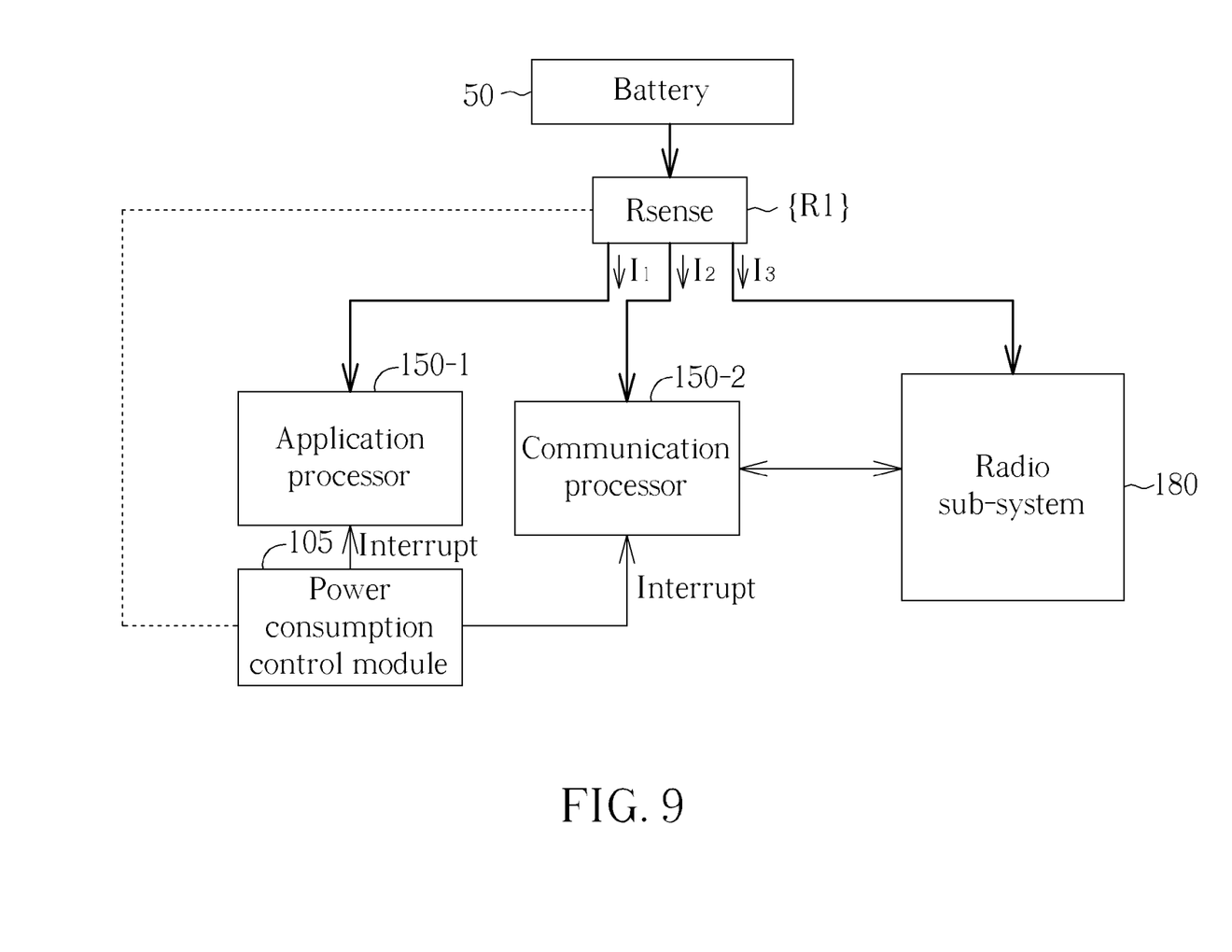
FIG. 9 illustrates another exemplary scenario involved with the method shown in FIG. 4 according to yet still another embodiment of the present invention.

FIG. 9 illustrates another exemplary scenario involved with the method 200 shown in FIG. 4 according to yet still another embodiment of the present invention, where this exemplary scenario can be taken as an example of the possible scenarios mentioned above, and the application processor 150-1, the communication processor 150-2, and the radio sub-system 180 can be the same as that shown in FIG. 5, respectively.

As shown in FIG. 9, the aforementioned resistor R1 of the embodiment shown in FIG. 5 is replaced by multiple resistors {R1} (labeled "Rsense", whose meaning is similar to that of the embodiment shown in FIG. 5). The resistors {R1} are utilized for sensing the plurality of currents {I} such as the currents $I_1$, $I_2$, and $I_3$ output from the battery 50 to the application processor 150-1, the communication processor 150-2, and the radio sub-system 180, respectively. Based upon the aforementioned voltage difference such as the difference between the first voltage level at the first terminal of a specific resistor R1 of the resistors {R1} and the second voltage level at the second terminal of the specific resistor R1 of the resistors {R1}, the power consumption control module 105 can check whether abnormal or excess current/power consumption occurs during a talking service, a data-link operation, etc.

In some embodiments such as those shown in FIGS. 5-9, the power consumption control module 105 is capable of detecting whether the representative $I_M$ of the current I reaches the predetermined threshold $I_{TH}$ to determine whether to send the interrupt(s) to the processor(s). This is for illustrative purposes only, and is not meant to be a limitation of the present invention. According to some variations of the embodiments shown in FIGS. 5-9, the processor(s) can periodically or non-periodically send request(s) to the power consumption control module 105 in order to acquire detection/comparison information (more particularly, the information regarding whether the representative $I_M$ of the current I reaches the predetermined threshold $I_{TH}$) from the power consumption control module 105, where the power consumption control module 105 may send the detection/comparison information in response to the request(s) from the processor(s), respectively.

It is an advantage of the present invention that the present invention method and apparatus can reduce power consumption of an electronic device. As a result, the user can use the electronic device without being bothered by power failure caused by unnecessary or excess power consumption, where the related art problems will no longer be an issue.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing power consumption control, the method being applied to an electronic device, the method comprising the steps of:
   sensing at least one current on at least one current path between a battery and at least one portion of the electronic device by performing sampling operations to generate a plurality of samples;
   performing calculation on the samples to monitor the current; and
   based upon the calculation, when it is detected that the current reaches a predetermined threshold, triggering a post processing operation by generating a signal to a processor of the electronic device for interrupting at least one of a plurality of functions performed within the electronic device by the processor;
   wherein at least the sensing and the performing calculation are performed when the processor of the electronic device is in a sleep mode.

2. The method of claim 1, wherein the at least one current is a total current output from the battery or a total current input into the battery.

3. The method of claim 1, wherein the post processing operation is utilized for reducing power consumption.

4. The method of claim 1, wherein performing the sampling operations to generate the plurality of samples further comprises:
   utilizing an analog-to-digital converter (ADC) to perform the sampling operations on a voltage difference corresponding to the current to generate the plurality of samples.

5. The method of claim 4, wherein the voltage difference is a difference between a first voltage level at a first terminal of at least one resistor and a second voltage level at a second terminal of the resistor.

6. The method of claim 4, wherein the voltage difference is a difference between a first voltage level at a first terminal of at least one Hall component and a second voltage level at a second terminal of the Hall component.

7. The method of claim 1, wherein the at least one current comprises a plurality of currents; and the step of sensing the at least one current on the at least one current path between the battery and the at least one portion of the electronic device by performing the sampling operations to generate the plurality of samples further comprises:

sensing the currents on multiple current paths between the battery and multiple portions of the electronic device by performing the sampling operations to generate the samples, respectively.

8. The method of claim 1, wherein the predetermined threshold is selected from a plurality of predetermined thresholds defined in at least one predetermined table; and the method further comprises:

checking the electronic device to detect whether a specific condition of a plurality of predetermined conditions is satisfied; and when it is detected that the specific condition is satisfied, utilizing a specific predetermined threshold corresponding to the specific condition as the predetermined threshold.

9. The method of claim 8, wherein the plurality of predetermined conditions is defined in the at least one predetermined table; and the method further comprises:

retrieving condition information corresponding to at least one portion of the predetermined conditions from the at least one predetermined table, for use of checking the electronic device, in order to detect whether the specific condition is satisfied.

10. The method of claim 8, wherein the post processing operation is selected from a plurality of predetermined post processing operations defined in the at least one predetermined table; and the method further comprises:

when it is detected that the specific condition is satisfied, utilizing a specific predetermined post processing operation corresponding to the specific condition as the post processing operation.

11. The method of claim 1, wherein the post processing operation comprises disabling a wireless transmission functionality of the electronic device.

12. The method of claim 1, wherein the post processing operation comprises turning off at least one component of the electronic device.

13. An apparatus for performing power consumption control, the apparatus comprising at least one portion of an electronic device, the apparatus comprising:

a processor, for performing a plurality of functions within the electronic device;

a current sensing circuit, coupled to a battery, capable of sensing at least one current on at least one current path between the battery and at least one portion of the electronic device by performing sampling operations to generate a plurality of samples; and a control module, coupled between the current sensing circuit and the processor, capable of performing calculation on the samples to monitor the current, wherein based upon the calculation, when it is detected that the current reaches a predetermined threshold, the control module is capable of triggering a post processing operation by generating a signal to the processor for interrupting at least one of the functions performed within the electronic device;

wherein the current sending circuit and the control module are activated when the processor is in a sleep mode.

14. The apparatus of claim 13, wherein the at least one current is a total current output from the battery or a total current input into the battery.

15. The apparatus of claim 13, wherein the post processing operation is utilized for reducing power consumption.

16. The apparatus of claim 13, wherein the at least one current comprises a plurality of currents; and the current sensing circuit is capable of sensing the currents on multiple current paths between the battery and multiple portions of the electronic device by performing the sampling operations to generate the samples, respectively.

17. The apparatus of claim 13, wherein the predetermined threshold is selected from a plurality of predetermined thresholds defined in at least one predetermined table; and the control module comprises:

a condition detection unit capable of checking the electronic device to detect whether a specific condition of a plurality of predetermined conditions is satisfied;

wherein when it is detected that the specific condition is satisfied, the condition detection unit is capable of utilizing a specific predetermined threshold corresponding to the specific condition as the predetermined threshold.

18. The apparatus of claim 17, wherein the plurality of predetermined conditions is defined in the at least one predetermined table; and the condition detection unit is capable of retrieving condition information corresponding to at least one portion of the predetermined conditions from the at least one predetermined table, for use of checking the electronic device, in order to detect whether the specific condition is satisfied.

19. The apparatus of claim 17, wherein the post processing operation is selected from a plurality of predetermined post processing operations defined in the at least one predetermined table; and when it is detected that the specific condition is satisfied, the control module is capable of utilizing a specific predetermined post processing operation corresponding to the specific condition as the post processing operation.

20. The apparatus of claim 13, wherein the post processing operation comprises turning off at least one component of the electronic device.

* * * * *